INVENTORS
JAMES C. FREDLEY and
BY GEORGE E. SLEIGHTER

ATTORNEYS

Dec. 14, 1965   J. C. FREDLEY ET AL   3,223,549
COATING OF GLASS SHEET WHILE DEFORMABLE
AND SUPPORTED ON GAS
Original Filed March 12, 1962   9 Sheets-Sheet 7

INVENTORS
JAMES C. FREDLEY and
BY GEORGE E. SLEIGHTER

ATTORNEYS

Dec. 14, 1965     J. C. FREDLEY ET AL     3,223,549
COATING OF GLASS SHEET WHILE DEFORMABLE
AND SUPPORTED ON GAS
Original Filed March 12, 1962                 9 Sheets-Sheet 8

INVENTORS
JAMES C. FREDLEY and
BY GEORGE E. SLEIGHTER

ATTORNEYS

INVENTORS
JAMES C. FREDLEY
BY GEORGE E. SLEIGHTER
Chisholm and Spencer
ATTORNEYS

United States Patent Office 3,223,549
Patented Dec. 14, 1965

3,223,549
COATING OF GLASS SHEET WHILE DEFORMABLE AND SUPPORTED ON GAS
James C. Fredley, Tarentum, and George E. Sleighter, Natrona Heights, Pa., assignors to Pittsburgh Plate Glass Company, Pittsburgh, Pa., a corporation of Pennsylvania
Continuation of application Ser. No. 178,997, Mar. 12, 1962. This application Nov. 9, 1964, Ser. No. 409,662
10 Claims. (Cl. 117—119.8)

This application is a continuation of application Serial No. 178,997, filed March 12, 1962, now abandoned which is a continuation-in-part of application Serial No. 139,901 filed September 22, 1961, now abandoned which is a continuation-in-part of application Serial No. 31,572, filed May 25, 1960 (now abandoned), all assigned to the assignee of this application.

This invention relates to the production of coated glass and is especially concerned with application of coatings to glass and/or to the treatment of coatings on glass at glass deformation temperature. As is well known, glass may be heated to a temperature at which the major surfaces or the contour thereof will be changed by a deforming stress or contact with solids, hereinafter referred to as a deformation temperature. For most plate and window glass this temperature is around 980 degrees Fahrenheit and above, but usually below a temperature at which the glass becomes molten.

As is explained in greater detail below, it has been found according to this invention that coated glass having improved properties may be produced by applying the coating to the glass or treating a previously applied coating at a glass deformation temperature. While such a treatment can improve the properties of the coating per se, it can impair the glass base so seriously that imperfections are transmitted to the coatings and thus the advantages which might otherwise accrue are not attained. This invention overcomes this and other difficulties.

Included in the instant invention are new and useful methods and apparatus for supporting and conveying hot glass while simultaneously thermally developing coating materials applied thereto either prior to or contemporaneously with the same simultaneous heating and support.

More specifically, methods and apparatus have been devised for supporting and conveying a sheet of glass on an inert fluid film, e.g., an inert gaseous film, while the glass is at or above deformation temperature. The film of gas uniformly supports the glass against undesired deformation and minimizes or even eliminates the necessity of contact of the major surfaces of the glass sheet with any solid object while the glass is subject to deformation or impairment. In this manner coated glass in which the coating is better bonded to the glass and/or has greater freedom from surface defects or has improved physical properties may be produced.

The invention herein contemplated may be performed in conjunction with other operations often applied to glass, such as tempering, annealing or the like. It is especially valuable for the production of bent glass having coatings thereon which are stable at high temperatures in the glass deformation temperature range.

In utilizing the instant invention for producing bent, coated glass products, the marring of the surface common to the prior art is overcome. Glass sheets are partially or completely supported by a gaseous support or supports while the sheets are heated to a temperature at which they can bend. Due to the substantial uniformity of support pressure provided by the gas film or support zones of the instant invention, the contour of the heated sheets may be maintained within close tolerances. By gradually changing the contour of the supporting gas film bed and conveying the heated sheets by gravity feed flow, edge contact, contact localized at the margins only, or a combination of the above, the contour of the sheets changes in travel to conform to the supporting force, resulting in sheets formed to a desired curvature. Coated curved sheets are produced either by applying the desired coating to the base before bending or by applying the coating while retaining the glass in its established contour on the gas film. The sheet thus treated may be tempered during cooling, if desired.

In the instant invention, glass sheets, for example, flat sheets, to be coated and/or to be tempered are supported upon a film, e.g., an inert film, of gas exerting a substantially uniform pressure so as to support the sheets against deformation while they are heated to a deformation temperature and the coating is developed thereon. Such support can be so effectively achieved that even previously warped sheets can be flattened. The movement of the sheets along the fluid support is controlled through physical means contacting only an edge or marginal portion thereof. After reaching the desired temperature, each sheet is moved between a supporting, relatively cold, flowing gas support and an opposing cold gas flow on the opposite major surface, both having sufficient flow and low temperature to establish the necessary thermal gradient between the surfaces and the interior, and is thus tempered without the marring or distortion characteristic of the prior art.

In addition to eliminating the foregoing disadvantages, the instant invention, through more efficient and uniform heat transfer, has substantially eliminated the irregular iridescent strain pattern characteristic of tempered coated glass, and has provided a process for fully tempering thinner coated glass to produce coated glass products of higher quality than has been possible under existing production processes.

Coated glass has myriad end uses. Many coatings require heat treatment during fabrication. For instance, in producing flat colored spandrels for architectural purposes, flat sheet glass is coated cold on one side with a frit or enamel and then "fired" to glaze the frit and bond it to the glass surface. Firing temperatures exceed the threshold thermal deformation temperature of the flat glass substrate. If produced on roller lehrs, wave, bow and other distortion results. If processed while suspended by tongs, tong marks ensue. Usually the product is chilled after firing to produce a semi-temper or partial strengthening. Full temper within practical quality limitations is well nigh impossible of achievement with existing processes because of lack of control. The heat transfer rate on one side of the sheet differs from that on the other. Existing relatively crude quenching blowers do not permit the control necessary to match the quantum of heat transfer on opposite sides—a practical "sine qua non" for achieving full temper.

Likewise, there is a desideratum for higher temperature in firing because the durability of the coating is enhanced thereby. The prior art is limited in this regard because above about 1150 degrees Fahrenheit, tongs not only indent but more or less tear the glass along the points of contact, while in the roller system wave results.

The present invention overcomes all these defects. The coated sheet can be fired at higher temperatures without marring or distortion by supporting the coated sheet on gas while heating to the desired temperatures for firing on the coating. Moreover, the coated sheet can be tempered to the degree desired by control of the rates of flow in the quenching section.

Again, a variety of useful end products are produced by spraying metallic salt solutions on hot glass. Transparent electroconductive tin oxide coatings are produced when a cold solution of a tin salt such as tin chloride is sprayed on hot glass. Transparent light and heat reflecting films are produced when solutions of cobalt and other metal salts are sprayed cold on hot glass. As in the case of enamels, the inadequacies of the prior art limit the temperature of sheet glass treatment below optimum temperatures useful in achieving not only maximum durability but other functional attributes such as enhanced electrical conductivity in conductive films. These deficiencies are overcome in utilizing the present invention.

The broad concept of supporting and conveying sheet material on a film of gas is, of course, known. These known methods and apparatus for supporting and conveying sheet material are, however, unsatisfactory for supporting a readily deformable, visco-elastic material while the material approaches a deformation temperature. Because the known methods and apparatus are incapable of supporting a deformable, visco-elastic sheet of material uniformly over substantially its entire area, their application to the support of glass sheets heated to a temperature at which they readily deform is precluded. Thus, the insufficiencies of design for the purposes herein intended of such a gas film support as disclosed in U.S. Patent No. 1,622,817 to Frederic B. Waldron result in an unacceptable distortion of any glass heated to the temperature at which it will readily deform when supported on a device of the nature disclosed therein.

Applicants have, through the use of the methods and apparatus disclosed herein which form the subject matter of this invention, overcome the above-discussed disadvantages of the known methods of treating, coating, supporting and conveying glass.

The attendant advantages of this invention and the various embodiments thereof will be readily appreciated as the same become better understood by reference to the following detailed description when considered in connection with the accompanying drawings in which:

FIG. 1 is a perspective, partly schematic, view illustrating a system for conveying, heating and quenching sheet glass parts embodying several features of the present invention; FIG. 1-A is another partly schematic perspective on a larger scale illustrating particularly how sheet glass parts are driven by discs contacting an edge of the part while it is otherwise supported entirely by a gas film over the inclined bed of FIG. 1;

FIG. 9A is a fragmentary view of FIG. 9 schematically showing details of the support bed;

Figure 1:
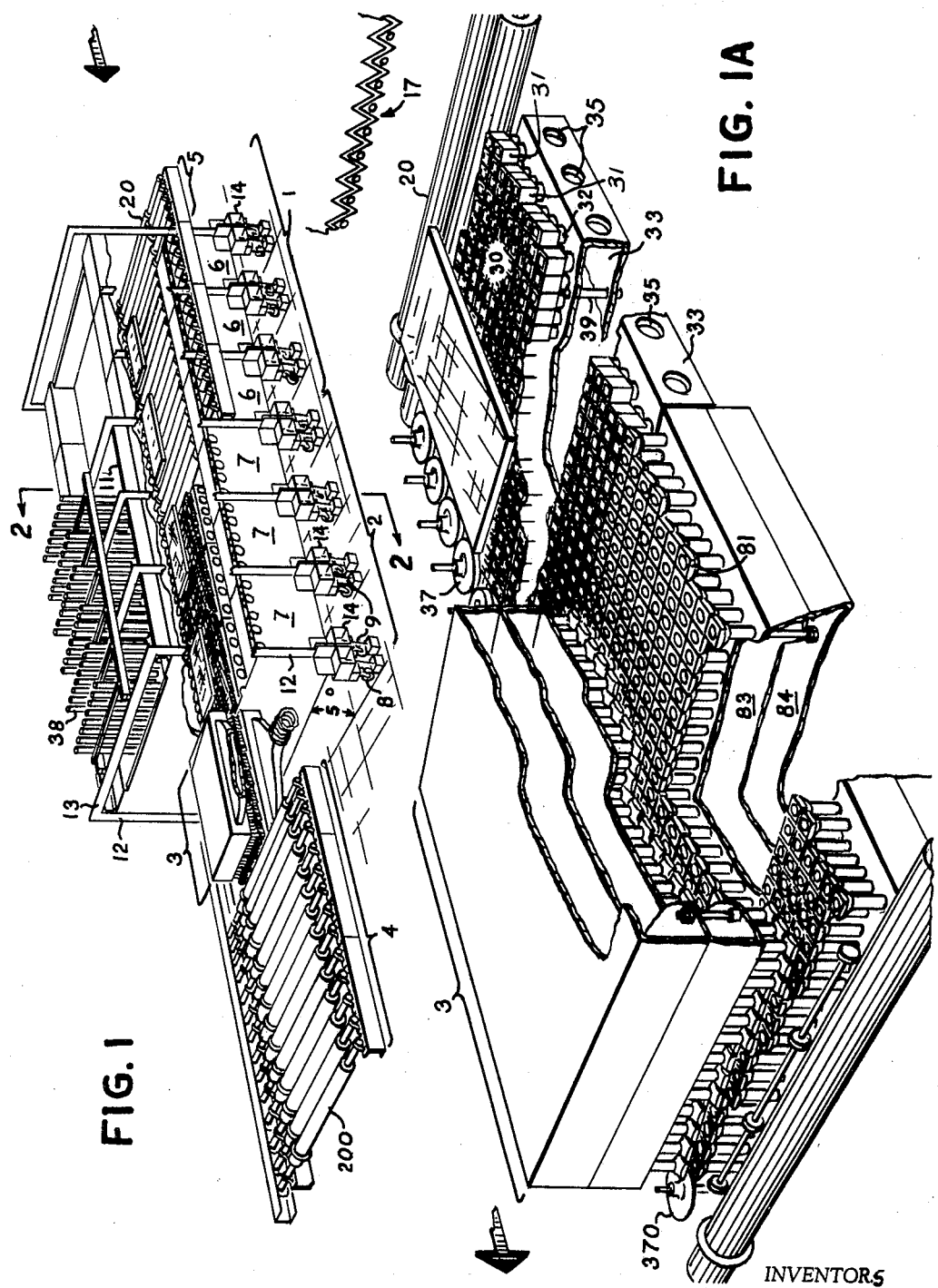

Referring to the drawings, FIG. 1 illustrates a system advantageously employed for heating flat glass parts up to or above the deformation temperature, e.g., to a temperature at which the glass can be tempered, quenching such parts while hot and delivering the parts thus tempered onto a roll conveyor for removal. The component sections making up the complete system consist of a preheat section 1 wherein the glass is conveyed on rollers between radiant heaters to preheat the glass until brought to a suitable preheat temperature under the deformation temperature; a gas film support heating section 2, where the glass parts are transferred to, and supported on, a film of hot gas while being conveyed through a frictional drive contacting the edges only of such parts, supplemental heat being supplied by radiant heat sources above and below the glass until the glass reaches a temperature high enough for tempering purposes; a quenching section 3, where the glass is rapidly chilled while suspended between opposed flowing films of cool air, edge contact driving being continued through the section, and a delivery roll system 4 which receives the tempered glass parts from the quenching system and conveys them to their next destination.

Preheat section 1 includes an apron roll unit 5 for loading, the first few rolls being idle and the last driven. Next in order of the direction of travel of the workpiece are three identical enclosed preheat units 6 followed by three enclosed hot gas support heating units 7, the quenching section 3 and the delivery section 4.

For ease in fabrication, all units 5, 6, 7 and sections 3 and 4 are assembled within rectilinear frameworks of support and mounted on casters 8 for convenience in assembly. Each unit and section is elevated from the casters 8 by jacks 9 into a position with the surfaces of all rolls and the gas support beds in a common plane tilted in a sidewise direction at an angle of five degrees with respect to the horizon. The essential framework consists of girders 11, stanchions 12, and beams 13 resting on support blocks 14.

THE PREHEAT SECTION

Each unit 6 of the preheat section includes a radiant floor 16 and a radiant roof 17 built up from individual electrical heating units consisting of heating coils 18 disposed in ceramic holders 19. Control is afforded so that each unit 6 may be regulated as to temperature across the path of travel and parallel thereto. Each unit is provided with a thermocouple (not shown) to sense the temperature of the unit and the glass and to actuate the unit to the extent necessary to supply the required amount of heat. Conveyor rolls 20 are provided with guide collars 21 in alignment throughout the section 1 so as to position the glass properly for transfer to the gas support next following. Each roll is journaled in bearings 22 and is driven through gears 23 from a common shaft 24 energized by drive motor 25. Temperature sensing devices (not shown) placed at intervals along the path of travel of the workpiece afford data from which to establish control.

GAS FILM SUPPORT HEATING SECTION

Figure 3:
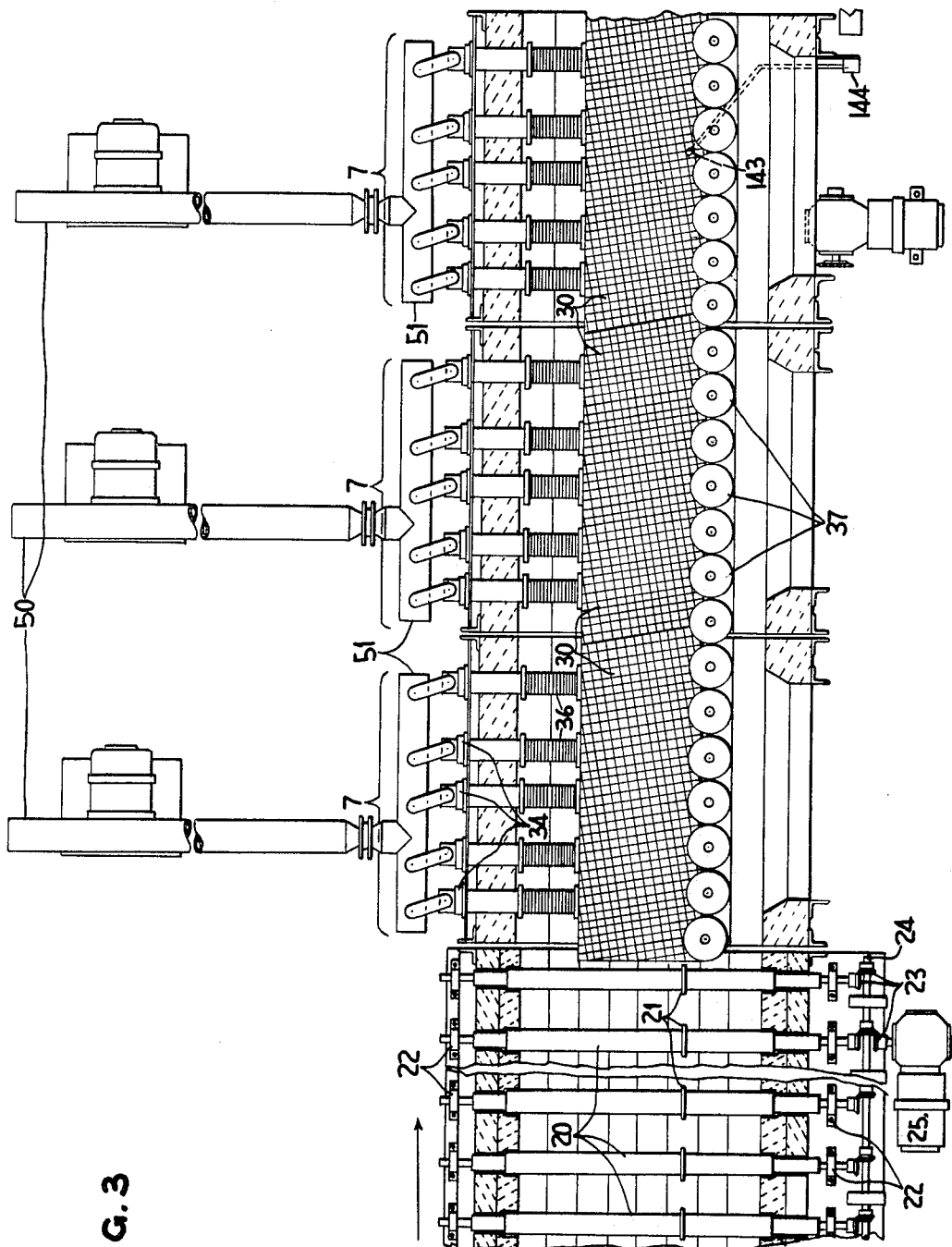
FIG. 3 is a partial plan view showing the arrangement of the preheat section with respect to gas film support heating section, the relative positions of the burners feeding combustion gases to the plenum chambers and the mechanism for conveying glass sheets by edge contact only.
Figure 4:
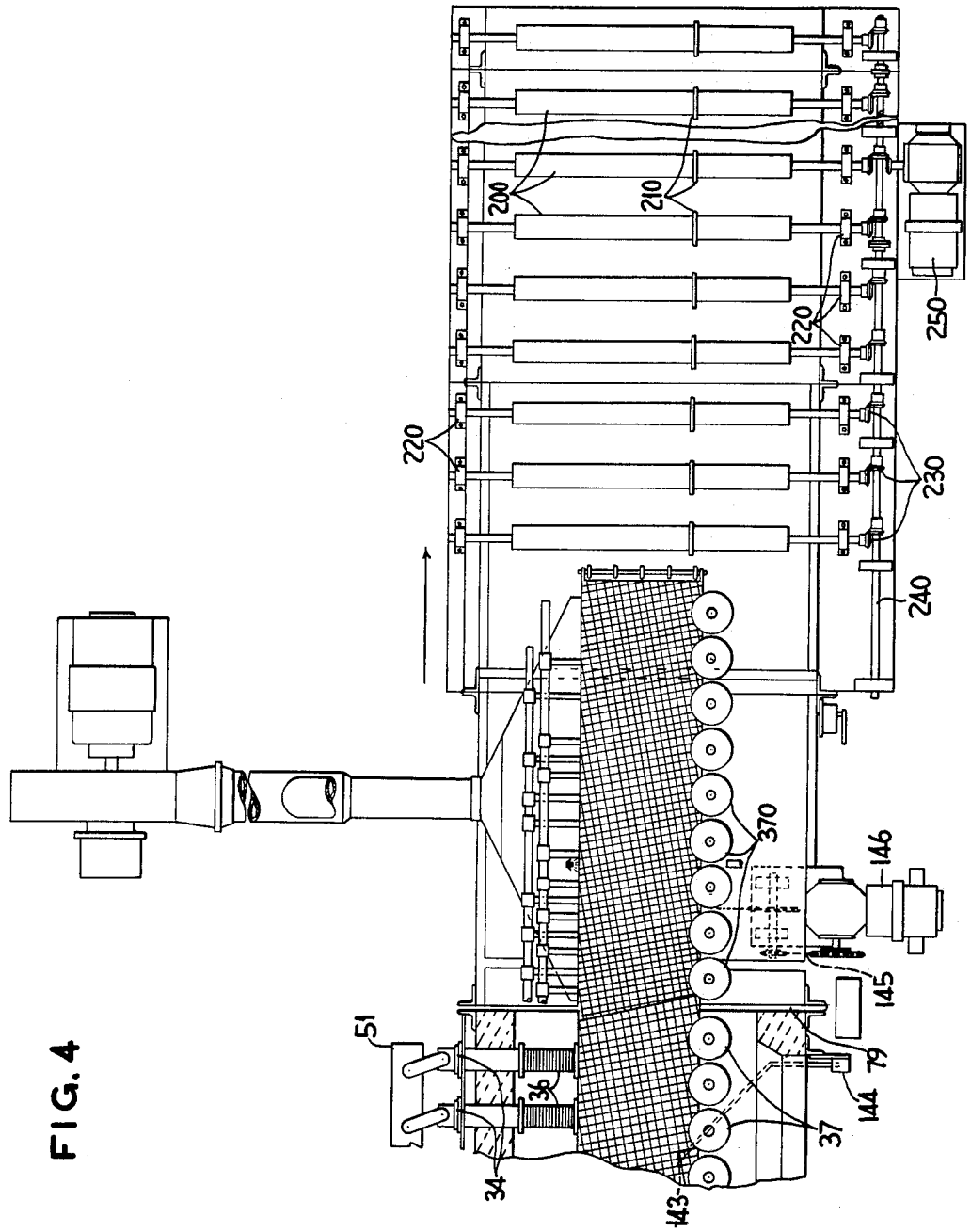
FIG. 4 is a partial plan view which is in effect a continuation of FIG. 3 and shows the terminus of the gas film support heating section adjacent the quenching section, the latter being followed by the conveyor roll run out sections.

As reflected in FIGS. 1 and 3, the gas film support heating section 2 is made up of three similar contiguous units 7, each fabricated within a supporting framework like the preheating units 6 and each having generally similar radiant floor 16 and roof 17 sections with heating coil units 18 susceptible of control by thermocouples in increments across and lengthwise of each unit.

As shown generally in FIGS. 1–A, 2, 3 and 4, each unit 7 includes a flat bed 30 of modules 31 in spaced but close juxtaposition each to the other and arranged geometrically like a mosaic. In the embodiment illustrated, all modules 31 have their upper termini of rectangular configuration and lying in a common plane. The modules 31 are arranged in successive rows crossing the intended path of travel of the workpiece, each row being at an angle other than 90 degrees from the path and spaced close to the next adjacent row as hereinafter described in more detail.

Figure 2:
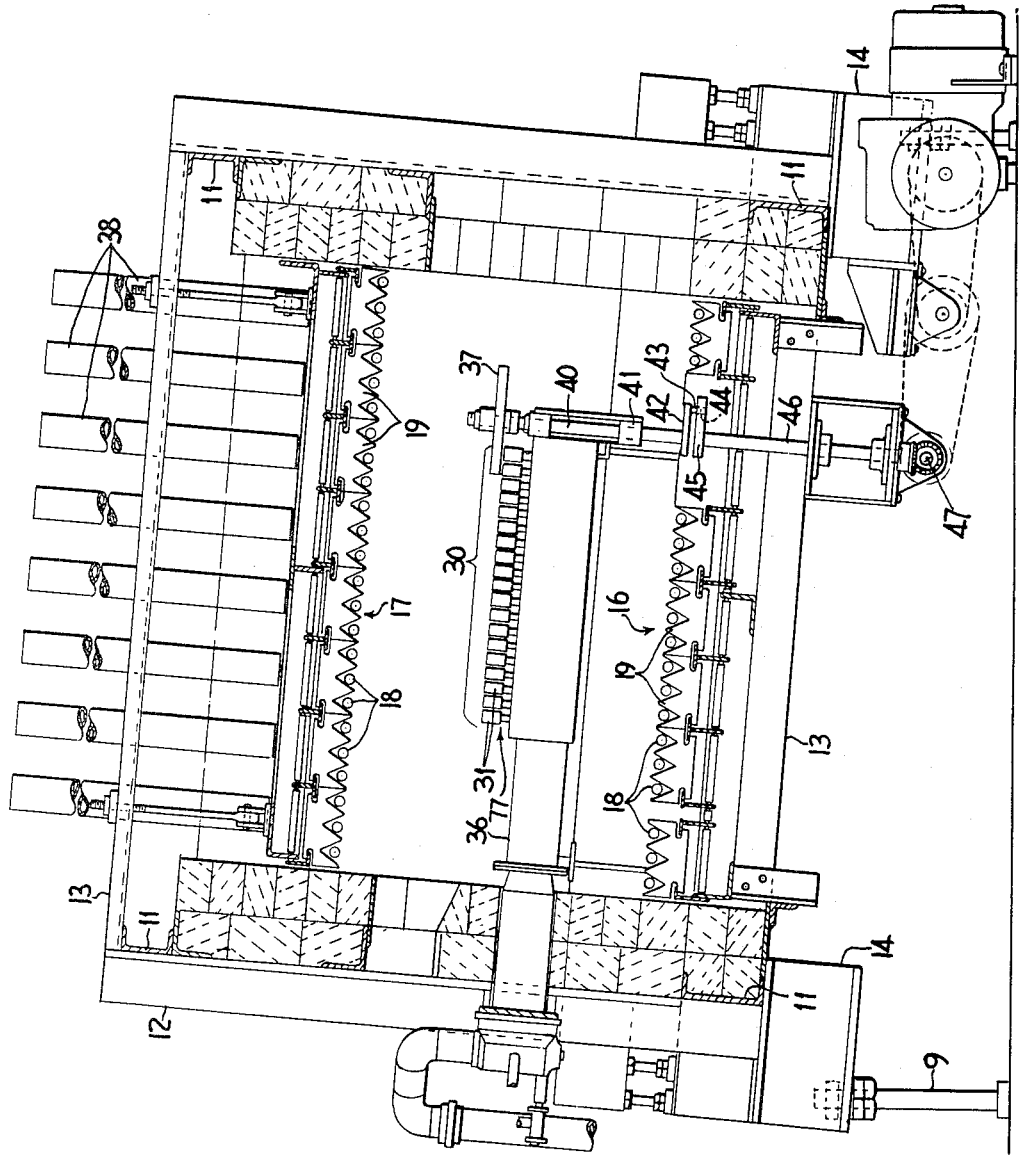
FIG. 2 is a detailed view partly in section and partly in elevation taken along the line 2—2 of FIG. 1.

Each module 31 has a stem 32 of smaller cross sectional area than the upper terminus and each opens into a plenum chamber 33 positioned below the bed 30 and acting as a support therefor. Each module is substantially enclosed and separated from other modules by an exhaust zone. The bed is adjusted to such level that the plane of the upper termini of the modules lies parallel to, but just below by approximately the height of the gap between the modules and the support height of the glass sheet, the plane defined by the upper surfaces of the conveying rolls 20 in a preheat section 6. At one side each plenum chamber 33 is in communication with five gas burners 34 through orifices 35 and flexible couplings 36. At the opposite and lower side of the bed 30 a series of uniform disk-like driving members 37 extend inwardly and just above the bed to frictionally engage one edge only of the workpiece and convey it along the bed in continuous straight line travel. A plurality of vents 38 project through the roof of each unit 7 to exhaust the interior to the atmosphere. Spaced intermittently in the bed 30 inboard of its margins are exhaust ducts 39 projecting through the floor of the plenum chamber 33 and communicating with the surrounding atmosphere in the furnace chamber thus serving to reduce the likelihood of pressure build-up in the central spaces between the modules 31 during the time when a workpiece overlies any substantial area of the bed. In addition, an exhaust channel 77 surrounding the module stems and disposed between the modules and the plenums provides exhaust paths to the sides of the module beds and hence to the surrounding atmosphere. Driving members 37 (FIG. 2) are mounted on shafts 40, journals 41 for which are supported by the supports for the plenum chambers. Each shaft 40 is driven through a coupling consisting of a crank arm 42 and pin 43, engaged by a slot 44 in cam 45, in turn rotated on shaft 46 which, except for the last three shafts 40 closest to the quenching section, is geared to drive shaft 47.

To supply air under pressure to the hot gas support combustion system, each unit 7 (FIG. 3) employs a blower 50 feeding air under pressure through a butterfly control to a manifold 51. Air is supplied from the manifold 51 to the individual burners.

The combustion of the products in the combustion chamber of the burner produces sufficient plenum pressure to supply the modules with heated gas of a uniform temperature and pressure. Adequate control of pressure and temperature are provided by correlating the rates of input of air and fuel to the burners. To supply enough gas to effect the desired support under normal conditions, an excess of air (usually 50 percent or more in excess) over that required for the combustion of the fuel gas is used. The supply of gas may be varied to change the heat input and the supply of air may be varied to change the pressure in the plenum.

The modules and plenum chamber are in most cases made of metal, such as iron, or like material having high heat conductivity and the modules themselves are in good heat conductive relationship to the plenum chamber, being connected thereto.

QUENCHING SECTION

Next adjacent the gas support heating section 2 in the direction of travel of the workpiece is quenching section 3. Separating the two is a partition 79 of asbestos board or the like for the purpose of segregating, as far as possible, the hot environment of heating section 2 from the cool environment of quenching section 2. An opening, not shown, in partition 79 is provided of such size and shape as to permit transfer of the workpiece from heating section 2 to quenching section 3 with minimum transfer of heat between the two sections.

As shown in FIG. 1–A, the quenching section 3 includes a flat bed of modules 81 arranged in mosaic pattern similar to that of the gas film support heating bed, but varying therefrom in certain respects hereinafter explained in detail. Each module 81 has a long stem 82 smaller in cross section than the upper terminus which projects through a cooling box 83 into a plenum 84, the cooling box and upper surface of the plenum acting as a support for the modules. The surface of the upper termini of the modules is adjusted to such level that it lies at the same level and in the same contour as that of the end portion of the gas film heating bed next preceding. These modules may be cooled by means not shown.

DELIVERY SECTION

As shown in FIG. 1, the delivery roll section 4 consists of conveyor rolls 200 provided with guide collars 210 in alignment with disks 370 of the quench section to maintain the proper position of the glass during transfer therefrom. Each roll is journaled in bearings 220 and is driven through gears 230 from a common shaft 240 energized by drive motor 250.

MODULE DESIGN

In accordance with an embodiment of this invention, highly developed and refined supporting apparatus have been provided to prevent the distortion of glass at deformation temperature, an important achievement not accomplished by known conveying apparatus and processes, including known air film support devices. Specifically, it is important to have a very large proportion of the glass sheet or plate supported by a uniform force. This prohibits flowing the supporting air film across substantial areas of a supporting plate (i.e., between such a plate and the supported glass) because of the creation thereby of a progressive pressure drop along the path of flow and, hence, a nonuniform supporting force. Furthermore, air introduced from a plurality of points beneath the supported glass must be exhausted beneath the supported area rather than merely by lateral flow to the glass edges to prevent a pressure build-up centrally of the supported sheet that will cause a doming effect upon the soft glass. The gas, having exhausted to points below the modules and adjacent the stems thereof, then flows principally to the sides of the bed through the exhaust channel 77 underneath the modules, some portion of the gas exhausting through ducts 39. This channel 77 is disposed underneath the modules, the module stems 32 which extend therethrough being long enough to provide adequate height to this space.

Of course, if the support zones are small in comparison with the exhaust areas, the support pressure will not be substantially uniform. If the exhaust areas are large in magnitude, thinner sheets of glass overlying these areas will have a tendency to sag. Conversely, if the support areas are too large and exhaust areas too small, doming of the glass tends to occur. Also, the pressure differential between the supporting pressure and the exhaust pressure must not be too great in order to avoid sagging.

Finally, it is important that the support be provided by a diffused and relatively small gas flow to provide substantially uniform pressure across the width of the support zone, thereby avoiding deformation, such as dimpling, from velocity pressure due to the direct impingement of localized jets of gas against the supported glass surface.

Figure 5:
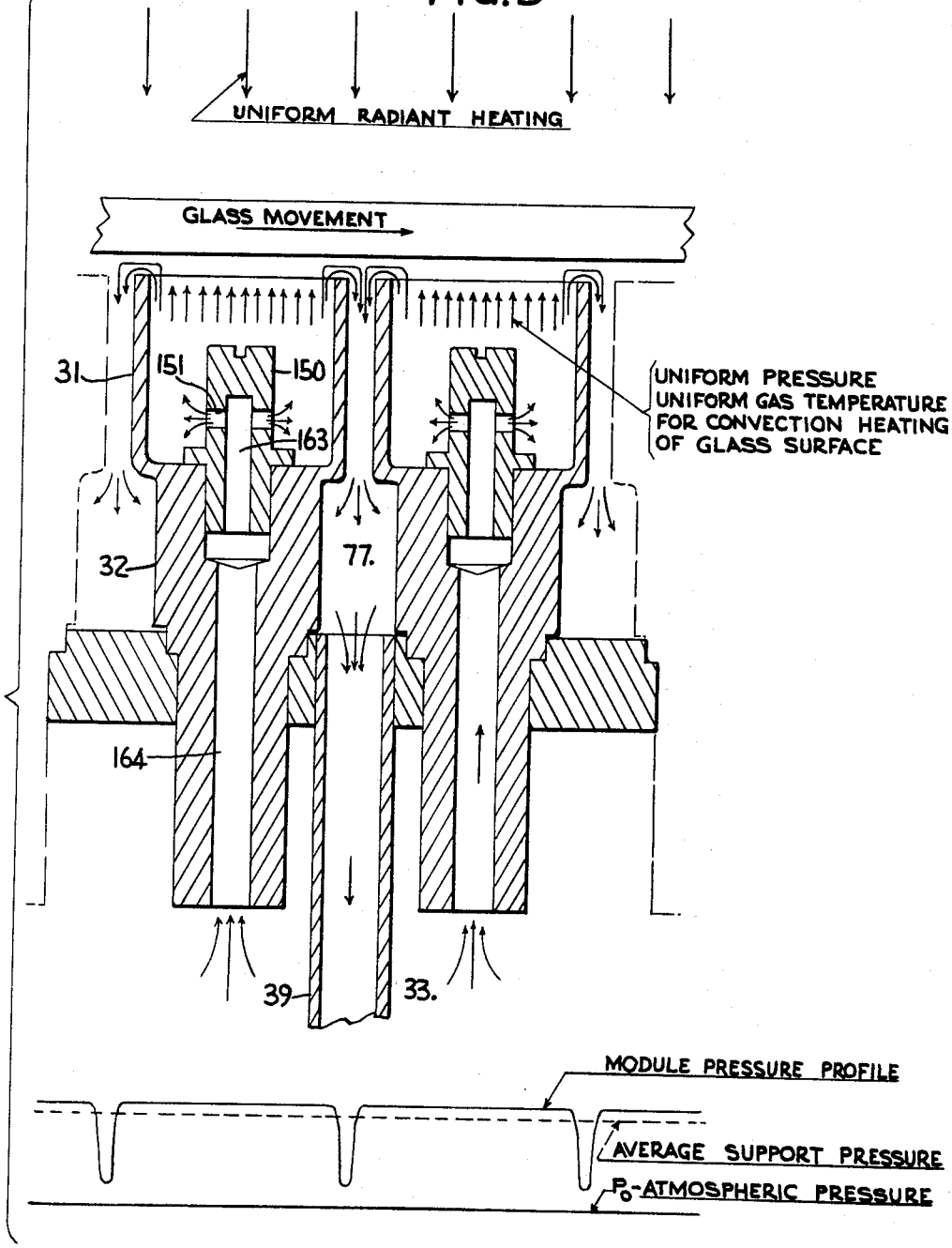
FIG. 5 is a schematic view on enlarged scale of a section of the gas support bed showing diagrammatically the flow and exhaust of the support gases and presenting diagrammatic graphs in conjunction therewith.

As shown schematically in FIG. 5, each module 31 forms an open-topped chamber, being essentially closed on its other sides, the upper terminus of which defines a zone of substantially uniform pressure (a profile of which is diagrammatically shown in FIG. 5) beneath the overlying glass. The pressure is exerted by gas supplied to each module from the supporting plenum chamber by way of the hollow supporting stem 32. A nozzle 150, in threaded engagement with an opening 162 in the base of the module 31 and having a bore 163 connected with the bore 164 of module stem 32, provides a gas inlet to the module chamber and also functions to diffuse the gas by changing the direction of flow to a horizontal direction as the gas escapes and expands into the module chamber through a plurality of bores or orifices 151 in the nozzle. The orifices 151 are so disposed to prevent direct impingement of pressurized gaseous fluid against the supported glass surface so as to prevent dimpling of the glass from the velocity pressure of a localized jet of gas. They deliver the gas to the module in a path which is initially out of the path of the glass.

Pressure profiles across the upper terminus of a module may be determined in the following manner: A pressure sensing plate having a small hole therethrough is positioned above a module and spaced from the upper terminus thereof a distance corresponding to the height of a supported sheet, e.g., 0.010 inch. A pressure transducer is connected to the sensing hole and the electrical output of the pressure transducer is connected to a recorder which will graph pressure variations on one axis and displacement of the pressure sensing plate on the other axis. The pressure transducer controls the displacement of the recording device along, e.g., the Y axis of the graph. A potentiometer, the shaft of which is rotated by relative horizontal movement between the sensing plate and the module, translates such movement to an electrical signal which controls the displacement of the recording device along the other, or X axis, of the graph.

Most advantageously, the relatively small size of orifices 151 of nozzle 150 provides a drop in gas pressure from the interior of the plenum to the interior of the module, and in so doing, performs three important functions: first, it prevents modules not covered by the supported glass from allowing the rapid escape of gas from the common plenum, which would reduce the pressure in the plenum and, hence, in the covered modules; second, it prevents variations of load above a module from affecting the flow of gas from the plenum into the module; and, third, it diminishes the effect of any slight variations in plenum pressure upon the pressure within the module. With this arrangement, the gap between the upper terminus of the module and the lower surface of the supported glass becomes self-adjusting to a uniform size about the entire upper periphery of the module, which size is a function of the weight of the glass supported. This occurs because the flow of gas from the plenum through the module and to the exhaust area passes through two restrictions: the orifices 151 in the base of each module, and the gap between the upper terminus of the module and the supported glass. Because the gap is normally quite large with respect to the orifices 151, there will be a substantially constant pressure drop through the orifices from the plenum to the module. The pressure per unit area of cross section across the module is, under normal equilibrium conditions, equal to the weight per unit area of supported surface of the glass which it supports, the gap between the module and the glass adjusting in size (i.e., changing the height of support of the glass from the module) until this pressure is obtained. Thus, if the gap becomes very small due to a heavy piece of glass or an external force upon the glass, the pressure within the module will increase until the pressure balances the load or until plenum pressure is reached as the gap approaches zero. If the gap diminishes to zero, there is, of course, insufficient pressure to support the load. The glass will be raised from the module by the gas in the module impinging against the lower surface of the glass under any module pressure greater than the weight of the glass, thus increasing the size of the gap and reducing the module pressure. In this manner, the gap is self adjusting to a uniform size, dependent upon the weight of the glass, the plenum pressure and the size of the orifices. The rate at which the pressure within the module builds up with decrease in the gap is a function of the rate of gas flow into the module and the volume of gas in the module. Hence, the orifice must not be so small for a given plenum pressure as to restrict the flow of gas into each module to the extent that excessive time is required to increase the pressure in response to a decrease in support spacing. In most cases sufficient gas should enter the chamber within not more than one second, generally less than 0.1 second and preferably almost instantaneously to supply the required increased pressure necessary to prevent the glass from touching the uppermost module edge.

Modules of small volume are more responsive for this purpose than are larger modules for a given flow rate. Generally the modules herein contemplated have a volume below 25 cubic inches, preferably not over about 10 cubic inches and most desirably less than about 2 cubic inches. By forming the support bed from identically constructed modules and supplying them with uniform pressure, each module will support the overlying portions of the glass sheet or plate along a desired surface. The proximity of adjacent modules results in substantially uniform support under the entire area of the glass sheet to assure a product substantially free of distortion.

As shown in FIG. 15, the gas within each module escapes across the upper terminus of the module walls to zones of lower pressure between adjacent modules. This lateral flow of gas between the module wall and the glass results in a progressive pressure drop across the width of the wall. However, the resulting area of non-uniform support pressure directly above the wall thickness and the area of reduced pressure at the exhaust zones between the modules is minimized by utilizing thin module walls (rarely averaging greater than 3/8 inch) and relatively low gas flow which permits the exhaust areas between the modules to be kept small yet adequate to exhaust the gas without building up back pressure. This is shown by the module pressure profile of FIG. 5 wherein the dips shown in the pressure profile at the exhaust areas are sufficiently small to have no adverse effect on the moving supported material. Thus, a substantially uniform average support pressure is achieved, as shown in dotted line in FIG. 5.

Each module 31 of the embodiment shown in FIG. 5 is square and exhausts radially in all directions to the surrounding zones of lower pressure, resulting in the pressure profile shown. The pressure over the exhaust areas, while lower than the support pressure, generally is slightly above ambient pressure to provide a gas flow from the supported surface to the exhaust channel beneath the modules.

The modules of the embodiments disclosed herein may vary in size, depending upon such considerations as the size of the glass sheets to be supported and the uniformity of support height desired along the dimensions of the supported glass. While square modules having outer dimensions of approximately one inch have been found to be generally satisfactory for a large range of glass sheet sizes, the module size may well vary in dimensions from about ⅛ to 2 or 3 inches on each side and need not be square, there being numerous other geometric or irregular shapes equally suitable. To achieve satisfactorily uniform support characteristics for sheets of glass or other sheet material heated to a deformation temperature, the distance across the upper terminus of each module forming the support bed should be no more than ½ of the correspondingly oriented dimension of the supported sheet and preferably should be less than ⅕ thereof. The module depth from the bottom to the open top may vary but must be substantial. Normally, it will be at least ¼ inch deep and in most cases ½ to 1 inch or more.

Figure 7:
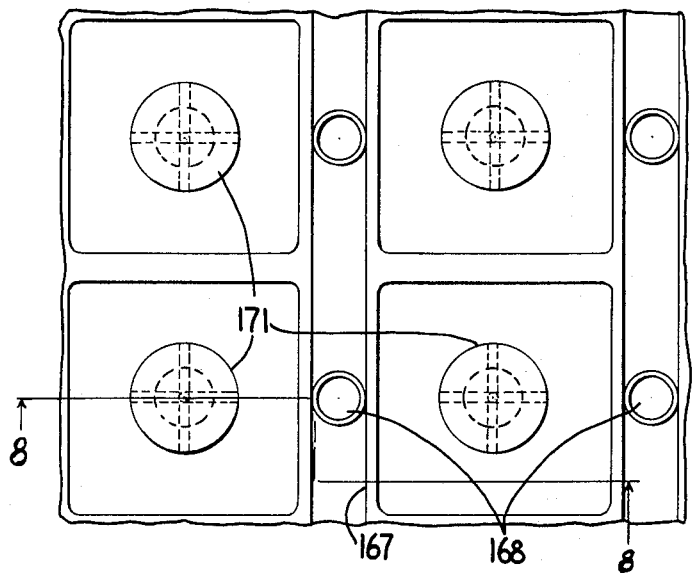
FIG. 7 is a partial plan view of support modules arranged in rows with alternate longitudinal grooves.
Figure 8:
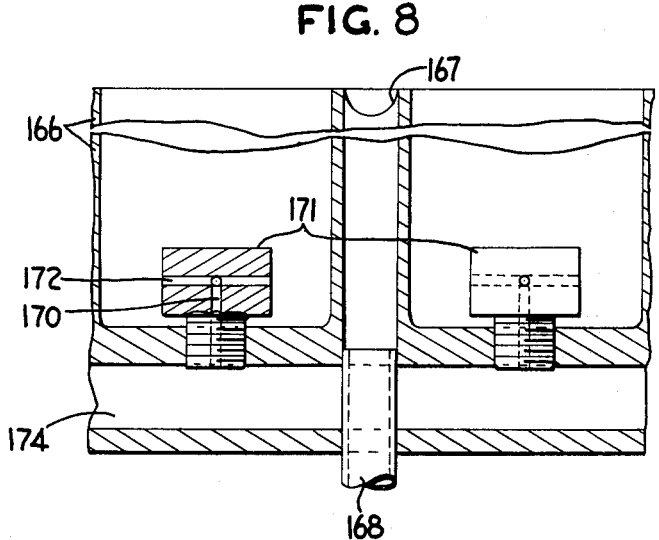
FIG. 8 is a section taken along line 8—8 of FIG. 7.

Module 166 of FIGS. 7 and 8 is similar to module 31 except that a plurality of these modules form an integral row and successive rows are spaced, one from the other, to provide exhaust zones 167 with ducts 168 to provide communication between the exhaust zones and the surrounding atmosphere. Alternatively, the rows may be individually formed with independent plenums and spaced from each other to form exhaust zones. A bore 170 in nozzle or baffle member 171 connects the orifices 172 in the nozzle with plenum chamber 174 to provide for the passage of gas from the plenum to the module cavity.

Figure 6:
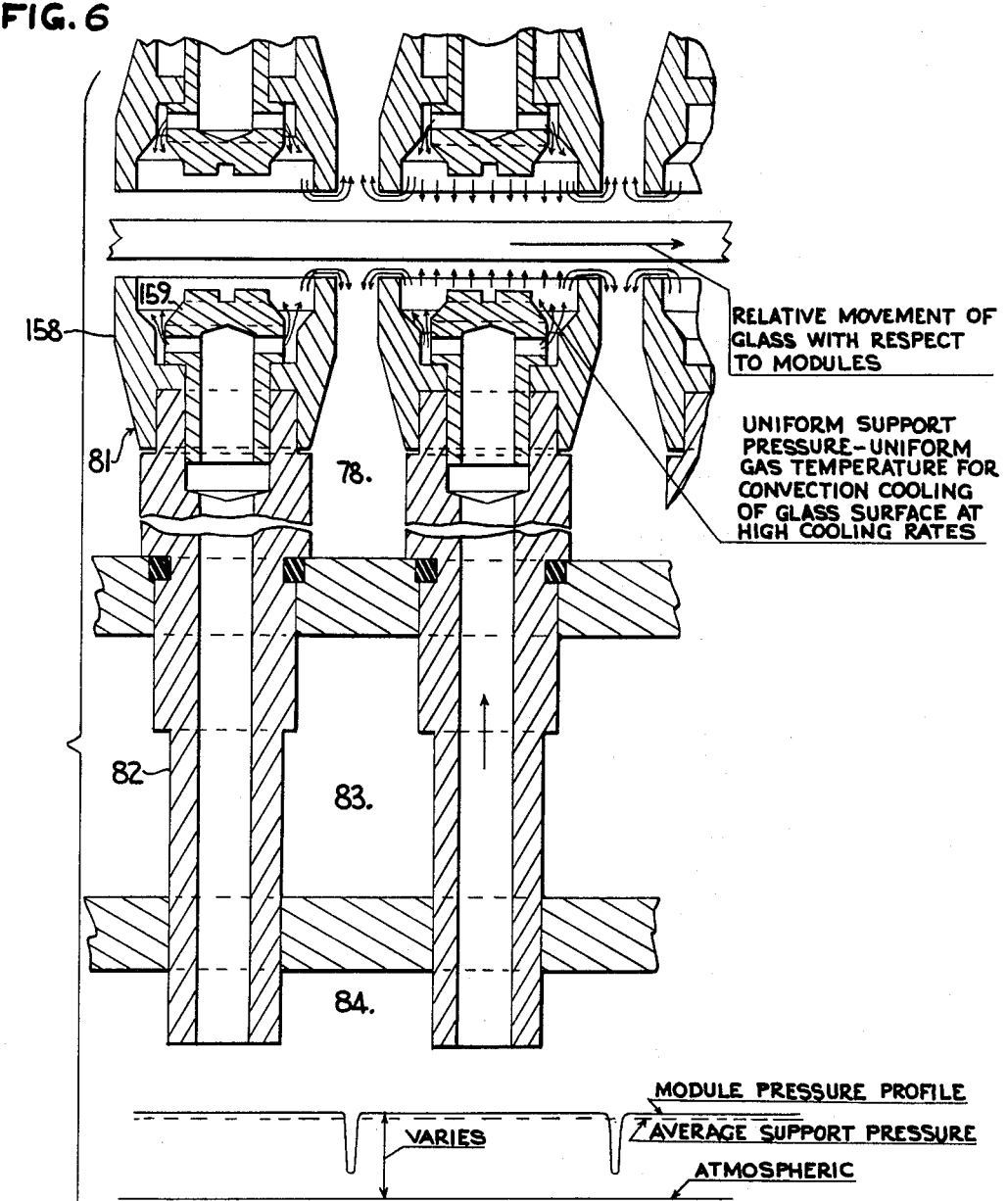
FIG. 6 is a view similar to FIG. 5, presenting diagrammatic graphs and flows in conjunction with the quenching system.

FIG. 6 illustrates one embodiment of a module 81 constructed to provide enhanced heat transfer characteristics for the quenching zone. This module is similar in construction and operation to the module 31 insofar as the principles of air-film support are concerned. The mass of the module wall 158 and of the nozzle 159 has been increased to locate a substantial mass of metal adjacent the supported glass while maintaining acceptable support characteristics, such as pressure uniformity.

In operation, a portion of the module stem 82 is surrounded by a heat exchange medium such as water or other fluid separately circulated through a cooling box 83 to cool the quenching modules 81 and to prevent heat distortion or to hold them at a substantially uniform temperature (e.g., plus or minus 100 degrees Fahrenheit) from module to module. Cooling gas flowing under pressure from plenum chamber 84 into the module cavities provides support for the glass in the quench zone in the same manner as the gas of the heating section provided support. The gas escapes through exhaust channel 78 between the modules and the cooling box to the edge of each quench bed. The majority of the cooling of the supported glass is accomplished by convection through the flow of gas from the module to the exhaust area; a moderate amount of cooling takes place through heat conduction from the glass, through the gaseous support medium, to the module; while very little cooling is accomplished through heat radiation from the glass to the module.

OPERATION

The following are examples, by way of illustration only, of preferred modes of operation of the invention disclosed herein as applied to the treatment of glass sheets.

Sheets of glass one-quarter inch nominal thickness and approximately 16 inches wide by 27 inches long are placed lengthwise seriatim upon the apron roll unit 5, properly aligned by guide collars 21 and conveyed on rolls into and through preheat units 6 at a line speed of 1.3 inches per second. In this manner an average of about 90 pieces of glass per hour are conveyed through the system. Electric heating coils 18 above and below the moving glass supply heat to the preheat section with an average power input of approximately 32 kilowatts to raise the temperature of the glass to approximately 950 degrees Fahrenheit surface temperature in approximately 15 feet of glass travel.

As the leading edge of the glass sheet leaves the last roll of the preheat section and progressively covers modules 31 forming support bed 30, the sheet becomes partly and finally fully supported by the uniform pressure of the gas emitted from the modules. The magnitude of this gas pressure is never large and, in any event, is held low enough and uniform enough from module to module so that it does not cause bowing or other deformation of the glass. Because the modules offer little or no support when only partially covered with glass, the rows are oriented at an angle from normal to the path of travel so that the edges of the glass sheet are at all times supported at least at spaced positions. In addition, this orientation assures even heating of the glass by preventing some portions thereof from traveling the length of the heating section over only exhaust areas, as would be the case if the modules were aligned in the direction of glass movement. Once the glass becomes gas supported, it is conveyed by edge contact through frictional engagement of its lower edge with rotating drive members 37. For this purpose, the entire system is positioned in a common plane tilted at an angle of five degrees with respect to the horizon to provide the glass with a component of force normal to the driving disks.

Gas burners 34 are supplied natural gas and air in proportions by volume of approximately one to thirty-six, respectively, which includes 260 percent excess air over that required to provide complete combustion. The natural gas is provided at a rate of approximately 60 cubic feet per hour per square foot of bed. The products of combustion are introduced to the plenum chambers, producing therein a pressure of approximately 0.5 pound per square inch gauge. Each module includes orifices which reduce this pressure in the module cavities when they are covered with glass to about 1/21 of the plenum pressure. Gas is introduced to the stem of each module at a temperature of 1200 degrees Fahrenheit and a volume flow of approximately 1.3 cubic feet per minute.

The module bed of this example is constructed of 120 modules per square foot of the type shown in FIG. 5 and the upper terminus of each module forms a square, the outer sides of which are one inch long, the spacings between the walls of adjacent modules being 3/32 of an inch. Each wall is 1/16 inch thick. For each square foot of glass area, the bed construction used herein provides 0.64 square feet of gas supply area (i.e., internal area of module at its upper edge), 0.163 square feet of gas exhaust area, and 0.196 square feet of module wall area separating the supply areas from exhaust areas. The nominal module support pressure when covered by the quarter-inch-thick glass is 0.023 pound per square inch above that existing above the glass which provides nominal spacing of 0.010 inch between the underside of the gas film supported glass and the upper terminus of the module wall. The nominal exhaust pressure is substantially one atmosphere absolute.

To heat the glass, the supporting gas is held at a temperature above (usually at least 10 to 50 degrees Fahrenheit above) that of the glass during the heating stage or until the glass has reached the desired temperature. In this case, heat is added to the glass plates convectively and radiantly from the supporting gas which is at a temperature of approximately 1200 degrees Fahrenheit and is added radiantly into the chamber from ceiling heating coils 18 at a temperature above (at least 25 degrees Fahrenheit above) that of the glass, usually about 1300 degrees Fahrenheit. When no glass is fed into the furnace, an average power input rate of approximately 30 kilowatts is established. As glass is fed into the furnace, the heaters are actuated to supply the fluctuations in heat demand. In this manner the temperature of the glass is raised to approximately 1200 degrees Fahrenheit or slightly below by the time it completes its travel through the 15 foot length of the heating section. Floor coils 18 beneath the plenum chambers consume power at an average rate of approximately 58 kilowatts under no-load conditions and supply heat at about 1300 degrees Fahrenheit to help maintain the ambient heat level in the furnace chamber and keep the plenum boxes hot. These coils may also supply heat to the module walls through conduction from the plenum box. Because heat must be applied equally to the top and bottom of the glass sheets to prevent bowing or other warpage of the glass, the gas is supplied at the approximate temperature to which the glass is to be finally heated. The radiant heat energy level (e.g., temperature) above the glass is then adjusted to balance the heat from below to keep the glass sheets flat. For example, glass bowed convexly upward in the early heating zones or in the quench zone frequently indicates excessive radiant heat. To achieve this desirable balance, it is advantageous to maintain the temperature of the radiant heat source disposed above the glass higher than that of the gas. Preferably, the temperature of the radiant source is 25 degrees Fahrenheit or more above the temperature of the supporting gas. The speed at which the glass is conveyed through the heating section is then controlled to obtain the proper heat input per glass unit and hence the proper temperature for tempering in the subsequent quenching section. The sheet is then moved rapidly from the heating section to the quench section where it is allowed to move at normal speed.

In the quenching section, air at an ambient temperature of approximately 100 degrees Fahrenheit is supplied to upper and lower plenum chambers to provide plenum pressures of 1.37 and 0.75 pound per square inch, respectively. Each module includes orifices which reduce this pressure to about ⅛ of the plenum pressure as the air escapes into the module cavities. The air is emitted at rates of 2.0 and 1.5 cubic feet per minute per module above and below the glass, respectively. Water is circulated through cooling boxes 83 at a flow rate of 1 gallon per minute per square foot of bed, the inlet temperature of the water being about 60 degrees Fahrenheit and outlet temperature being about 80 degrees Fahrenheit. Each quench module bed of this example is formed of one-inch square modules evenly spaced from each other to provide 102 modules per square foot. For each square foot of glass area, there is provided 0.24 square feet of cold air supply area, 0.29 square feet of exhaust area and 0.47 square feet of module wall area. The gap between walls of the adjacent modules is 3/16 of an inch. The average spacings of the glass from the lower and upper module surfaces measured to the opposed glass surface is 0.010 inch and 0.050 inch, respectively. The overall heat transfer coefficients above and below the glass are equal and about 81 British thermal units per square foot per hour per degree Fahrenheit. Of the heat removed, convection accounts for approximately 80 percent, conduction and radiation accounting for the remainder.

The module rows of the quenching section are oriented at a slight angle, usually 3 to 45 degrees and in this case 10 degrees, from normal to the path of travel to support the edges of the glass in the manner explained with respect to the heating section, and to assure even cooling of the glass over the entire surface thereof to minimize the formation of an iridescent stress pattern in the glass.

The glass travels through the 7 feet of the quench zone in approximately 30 seconds. In the initial 15 seconds, the temperature of the glass is lowered through the annealing range. In the remaining 15 seconds, the temperature of the glass is lowered to approximately 600 degrees Fahrenheit. The glass, at this point being no longer deformable, is conveyed from the air support of the quenching system to the rolls of the delivery system by disks 370 and thence to their next destination.

Quarter-inch thick glass so tempered has a stress, in terms of the center tension thereof as indicated by the birefringent effect of the glass on polarized light waves, of approximately 3200 millimicrons per inch of glass length as measured by standard techniques using a polariscope. Stress will hereinafter be referred to in terms of the center tension expressed in "millimicrons per inch."

When enamel frits are to be applied to glass sheets and the coating is to be fused or heat-set, the frits are generally first applied in a conventional way to the glass sheet in a suspension form, i.e., at normal atmospheric temperature, for example, in an aqueous system wherein at least part of the frit materials is suspended in the aqueous medium. The suspension generally contains water, alcohol, a thickening agent, e.g., diethylene glycol, a suspension agent, e.g., sodium nitrite, and a dispersion agent, e.g., sodium pyrophosphate. Minor amounts of a foam reducing surface active agent, e.g., octyl alcohol, can also be added. A viscosity improving agent such as a viscosity reducing agent, e.g., citric acid, can likewise be added to reduce the viscosity of the frit composition and prevent the enamel from developing pinholes or void spaces in the coating. On the other hand, a viscosity increasing agent, e.g., methyl cellulose, can be added to the frit to increase the viscosity of the liquid vehicle should this be necessary. Typical suspensions containing solids dispersed in a liquid vehicle which can be employed for coating glass sheets while the glass sheets are supported on an inert fluid film and heated to a thermal deformation temperature in accordance with the procedure of the instant invention are shown in Table I:

*Table I*

PARTS

| Ingredients | I | II | Permitted range |
| --- | --- | --- | --- |
| Water | 70 cc | 70 cc | 30–70 cc. |
| Methyl alcohol | 30 cc | 28 cc | 70–27 cc. |
| Diethylene glycol | 1 cc | 2.5 cc | 2%–10% by volume of alcohol. |
| Sodium nitrite | 0.2 g | 0.1 g | 0.09%–0.12% of solids by weight. |
| Sodium pyrophosphate | 0.1 g | 0.1 g | 0.05%–0.11% of solids by weight. |
| Solids (coloring frits) | 200 g | 130 g | 130–250 g. |

Various well known enamels (coloring frits) are dispersed within the above vehicle by ball milling to a particle size of less than about 200 mesh and introducing the particles into the liquid vehicle. Typical frits used for various colors follow in Table II:

*Table II*

| Color | Ingredients | Parts by weight |
| --- | --- | --- |
| A. Medium Blue | Harshaw K886 White | 17.5 |
|  | L755 Blue | 57.5 |
|  | K733 Blue-Green | 25.0 |
| B. Brick Red | Vitro 7550E White | 33.0 |
|  | 7410H Brown | 12.0 |
|  | 7226A Red | 48.0 |
|  | 7152B Orange | 7.0 |
| C. Peacock Green | Vitro 7550E White | 19.8 |
|  | 7353C Green | 31.0 |
|  | 7105D Yellow | 44.0 |
|  | 7496B Black | 5.2 |
| D. Smoke | Vitro 7550E White | 94.0 |
|  | 7410H Brown | 5.0 |
|  | 7353C Green | 1.0 |
| E. Orange | Harshaw X R966 Red | 23.3 |
|  | K886 White | 69.8 |
|  | X R253 Brown | 6.9 |

These frits are enamel-forming compositions having analyses shown in Table III:

*Table III*

FRIT COMPOSITIONS (PARTS BY WEIGHT)

| Ingredients | Harshaw | | | | | Vitro | | | | | | |
|---|---|---|---|---|---|---|---|---|---|---|---|---|
| | K733 | K886 | L775 | XR253 | XR966 | 7105D | 7152B | 7226A | 7353C | 7401H | 7496B | 7550E |
| $SiO_2$ | 28.17 | 22.73 | 27.16 | 26.57 | 27.36 | 18.50 | 24.42 | 25.56 | 22.64 | 23.40 | 26.80 | 25.98 |
| $Na_2O$ | 3.63 | 3.47 | 4.39 | 3.52 | 3.83 | 3.40 | 3.50 | 3.98 | 3.70 | 2.66 | 4.33 | 3.83 |
| $Al_2O_3$ | 1.77 | .29 | 8.34 | .84 | 1.06 | 5.94 | .87 | .63 | 4.37 | 1.12 | 3.16 | 1.00 |
| $ZrO_2$ | 3.05 | 3.50 | 2.42 | 4.46 | 2.45 | 1.91 | 1.67 | 2.35 | 2.30 | 1.96 | .04 | 2.70 |
| $Cr_2O_3$ | 4.59 | T | T | 2.74 | T | T | T | T | 15.45 | 9.22 | .25 | T |
| PbO | 45.66 | 48.13 | 44.69 | 44.58 | 45.90 | 53.46 | 42.44 | 46.37 | 39.51 | 36.42 | 46.19 | 46.18 |
| BaO | .50 | .45 | .93 | .92 | .79 | T | T | T | T | T | T | T |
| CdO | .20 | T | .32 | .27 | 6.53 | T | 12.02 | 5.44 | T | 3.40 | T | 3.29 |
| ZnO | 1.60 | .94 | .32 | 2.80 | T | 2.58 | --- | --- | .14 | 5.04 | --- | --- |
| $B_2O_3$ | 4.16 | 7.57 | 2.25 | 6.27 | 4.64 | 4.91 | 4.64 | 4.64 | 2.49 | 3.26 | 4.67 | 4.67 |
| MnO | T | T | --- | --- | T | T | T | T | T | .10 | 3.95 | T |
| $Fe_2O_3$ | .03 | .01 | .03 | 2.86 | .03 | .03 | .05 | .04 | .11 | 8.96 | 3.49 | .03 |
| $TiO_2$ | 3.06 | 13.00 | 1.53 | 1.66 | 1.74 | 4.08 | 2.53 | 2.63 | 2.63 | 2.10 | 2.66 | 11.65 |
| CoO | 1.13 | ND | 5.00 | --- | ND | ND | ND | ND | 3.20 | T | 2.68 | ND |
| $Sb_2O_5$ | ND | ND | ND | T | T | 4.55 | --- | --- | T | ND | ND | ND |
| $Cu_2O$ | T | T | T | .27 | T | T | T | T | T | T | --- | --- |
| $Bi_2O_3$ | T | T | T | T | .04 | T | T | T | --- | --- | T | .03 |
| CaO | T | T | T | T | T | .02 | T | T | --- | --- | .04 | .03 |
| MgO | T | T | T | T | T | .04 | T | T | 1.67 | T | .10 | T |
| NiO | T | ND | T | T | T | ND | T | T | T | --- | .22 | ND |
| $Li_2O$ | ND | ND | T | ND | ND | ND | ND | ND | ND | T | ND | ND |

The chemical analysis of the ingredients recited above was determined by wet chemical analysis and absorption spectrophotometric analysis supplemented by qualitative emission spectrographic analysis. In the table of ingredients listed above, T indicates a trace, ND indicates not detected, and ____ indicates not determined.

These coatings are applied to glass sheets in the manner well known to those skilled in the art of enameling glass, after the sheets are washed with water and/or detergent to remove any dirt from the surfaces thereof and the sheets are dried. Either a single coating or a plurality of coatings may be applied as desired. The coated sheets are then heated by placing them on the preheat section discussed above, usually with the coated side upward, and after the sheets are brought up to temperature they are delivered to the gas support heating section in the manner described above in connection with the tempering operation. While the coated glass is thus supported on the hot gas, the temperature of the glass sheet and its coating is raised to a thermal deformation temperature at which the frit coating fuses or melts and bonds to the glass base. Thereafter, the thus treated sheets are passed to a cooling section (for example, the tempering section discussed above) where the glass sheets with the coating baked thereon are tempered and cooled.

While it is necessary to support the glass sheet with the coating thereon on the gas support only while the temperature of the glass is heated to and maintained at a thermal deformation temperature, it should be understood that the glass sheet can be supported throughout the entire overall operation, viz, washing and cleaning, preliminary drying, coating, heat treating, annealing, cooling, and conveying operations.

The foregoing embodiments of this invention are readily adaptable to the provision of glass with many types of coatings, including enamels, metal oxides, metals, and the like.

Another typical spandrel-type frit coating which can be used is the following composition:

| | |
|---|---|
| Bentonite | 1.2 grams. |
| Cryolite | 0.8 gram. |
| Boric acid | 0.3 gram. |
| Methanol | 10 cubic centimeters. |
| n-Propanol | 15 cubic centimeters. |
| Water | 75 cubic centimeters. |
| Sodium pyrophosphate | 0.1 gram. |
| Aluminum powder (Alcoa No. 322) | 10 grams. |

The glass thus coated is fed through the preheating and heating zones herein disclosed, the temperature of the supporting gas passing through the modules being 1250 degrees Fahrenheit and the temperature of the radiant heat source being 1350 degrees Fahrenheit. The glass sheet is held at this temperature until the coating has binded itself to the base. Thereafter it is withdrawn from the heating section and cooled.

Glass spandrel units may be produced which have a colored pigment underlayer covered with an aluminized surfacing layer. In this case, the enamel formulation for the base flux can be formulated from a wide variety of enamel frit materials. A typical formulation for this purpose is set forth in Table IV and is observed to give excellent aluminized enamel frit spandrel-type coatings:

*Table IV*

| Ingredient: | Parts by weight |
|---|---|
| PbO | 55–65. |
| $SiO_2$ | 15–25. |
| $B_2O_3$ | 2–5. |
| $ZrO_2$ | 0–6. |
| $Na_2O$ | 5–15. |
| CdO | 0–5. |
| Coloring pigments | 5 to 20% by weight of the above mixture. |

Suitable coloring pigments which can be employed to impart color to the base flux are cadmium sulfoselenide for red color, cadmium sulfide for yellow color, cobalt oxide for blue color, chromium oxide for green color, cobalt, chromium oxide and ferric oxide for black color, and titanium oxides for white color.

The metallic aluminum coatings are applied over the base flux coatings described above. Typical coating compositions useful for this purpose are stated in Table V, the ingredients of the respective liquid vehicles used being first set forth and thereafter the amounts of the solid ingredients contained per 100 cubic centimeters of the liquid vehicle:

*Table V*

| Composition | A | B | C | D | E | F | G |
|---|---|---|---|---|---|---|---|
| Liquid vehicle ingredient (cc.) | | | | | | | |
| Distilled Water | 89 | 87.5 | 85 | 88 | 86 | 75 | 87 |
| Wetting agent (Atlas Powder Co. Tween 21, nonionic wetting agent, polyoxyethylene sorbitan monolaurate, 5% solids) | 1.0 | 1.5 | | | | | |
| Butyl carbitol | | | | 1.0 | | | |
| Butyl alcohol | | | | | 1.0 | | |
| Methyl alcohol | | | 8 | 3 | 4 | 10 | 4 |
| Normal propyl alcohol | 10 | 11 | 7 | 8 | 9 | 15 | 9 |
| Total liquid vehicle (cc.) | 100 | 100 | 100 | 100 | 100 | 100 | 100 |
| Solid vehicle ingredient (grams): | | | | | | | |
| Silicone resin Emulsion (GE 81529 25% solids) | 7 | 7 | 8 | 8 | 8 | 8 | 8 |
| Sodium pyrophosphate ($Na_4P_2O_7 \cdot 10H_2O$) | 0.04 | 0.04 | | | | | |
| Aluminum powder (Alcoa #322) | 11 | 11 | 12.5 | 12.5 | 12.5 | 10 | 12.5 |
| Cryolite | | | | | | 0.8 | 0.5 |
| Bentonite | | | | | | 1.2 | |
| Boric acid | | | | | | 0.3 | |
| $Na_2SiO_3 \cdot 9H_2O$ | | | | | | | 0.1 |

Sodium pyrophosphate can be conveniently employed for dispersion of pigment as well as balancing the pH of the emulsion in Composition A. It can be omitted where methyl alcohol replaces propyl alcohol in the coating vehicle. The wetting agent serves to increase the stability of the emulsion. This, too, can be omitted in cases where methanol is substituted in part for propanol. The shelf life of the compositions free from wetting agents is greater than those including them.

The metallic aluminum particles are conveniently employed in the form of small leaves. The leafing quality of sprayed aluminized mix is improved when propanol is employed rather than other alcohols. However, other alcohols can be used in mixtures containing the heavier alcohols, such as glycerol, ethylene glycol, etc. Butyl carbitol imparts improved leafing properties and results in smoother coatings to the surface upon which it is deposited.

In place of the above mentioned silicones, other combustible organic resinous adhesives can be used as a fugitive binder material (temporary binder) to bind aluminum powder to glass and to other aluminum particles while the coating is being deposited onto the substrate and before fusing the frit components to the base. Any resin which decomposes during the heating operation and which has the ability to temporarily bind frit particles to the base can be employed. Only a small amount of resin is required since it is thermally decomposed and/or volatilized during the heat setting operation.

The aluminum powder employed preferably has particle sizes such that less than 0.5 percent of the said powder fails to pass through 100 mesh screening while 92 percent passes through 325 mesh screening. Finer grade aluminum powders do not fire as well in the heat setting operation at the temperatures used for firing and are more likely to oxidize and produce an unfavorable exterior appearance on the surface of the spandrel-type coating.

A mixture of particle sizes can conveniently be employed to provide the beneficial results of each of the different particle sizes of the mixture. When providing the normal spandrel-type coating with an aluminized exterior surface, a slightly longer firing schedule is necessary in the fusion of the frit in order to compensate for the high reflectance of the aluminum particles. Since the glass is supported and held flat by the air supports even though in a plastic or deformable state, such deformation temperatures can readily be employed without causing distortion of the glass base.

In addition, glass sheets can be provided with metallized coatings following the procedure described above by omitting the application of a colored enamel frit or by substituting a colorless or transparent undercoat. Any of the glass frit enamels listed above with the coloring ingredients omitted therefrom can serve as colorless undercoats of this type.

While the spandrel-type coating compositions have been described above with great particularity, it should be realized that the present invention does not depend for its advantageous results upon any specific type of glass frit coating composition. The beneficial aspects secured by the present invention are largely due to the ability to avoid thermal distortion of the glass while simultaneously supporting the glass on the inert gas while the glass is in a visco-elastic state and coating the glass or thermally developing the coatings preliminarily deposited thereon.

Instead of applying the coating to the glass before heating, the glass may be heated to deformation temperature and coatings applied to the hot deformable glass while it is supported on gas supports. These films or coatings can be transparent, opaque, or translucent to visible, infrared, or ultraviolet radiations, and may, if desired, have light or heat reflecting properties or may be electroconductive or have other properties.

For example, glass sheets can be heated to a temperature of about 1100 to 1250 degrees Fahrenheit or even higher, and sprayed with a metal halide which can be in aqueous solution, e.g., stannic chloride, titanium tetrachloride, cobaltous or cobaltic chloride, etc., while the glass is in a plastic or deformable condition and is simultaneously supported on a gaseous support, thus producing translucent, opaque or transparent metal oxide coatings on the glass without imparting distortions either to the coatings or to the glass substrate. By recourse to this process, tong marks, roller marks and like defects, imparted by prior art procedures to support the glass while the glass is heated, are avoided.

The art of producing transparent electroconductive metal oxide coatings is well developed, as described in various United States Letters Patent, including the following: 2,566,346, 2,567,331, 2,833,902, 2,617,741, 2,617,742, 2,617,745, 2,602,032, 2,730,598, 2,648,754, 2,894,858, and many others. Improved glass sheets are prepared, according to the methods described in these patents, by applying the metal halide to the glass while it is heated to a temperature at which it is deformable or plastic and is supported by the air supports.

Enameled glass may be prepared by applying the various frit-containing coatings or enamel-forming coatings described above to the glass sheet after it has been heated to a plastic or deformation temperature (for example, 1100 to 1300 degrees Fahrenheit) and while it is supported on the hot gas support heretofore described. For example, after the glass has been heated and as it passes over the module bed at the end of the heating section, the enamel coating may be applied by spraying or the like.

The following examples are illustrative:

EXAMPLE I

Three spray guns are mounted in a row 7 inches apart to dispense frit composition, and a single spray gun is mounted in the row 10 inches beyond the last frit spray gun to spray the aluminum composition. The row of spray guns are directed downward and reciprocate transversely across the path of movement of the glass, making 26 passes per minute across the glass plates. The spray guns are attached to 10-gallon pressure tanks containing the respective coating compositions. Tank pressure maintained in the tanks is approximately 2 p.s.i.g. The atomizing air gun pressure is controlled between 27 and 30 p.s.i.g. The rate of feed of the frit and aluminum compositions is about 160 cc. per minute. The frit composition which is preliminarily applied to the glass plates through the three spray guns is a composition specified above in Table II. The aluminum coating applied finally is one of those specified in Table IV.

Flat glass plates 12 inches by 12 inches by one-quarter inch are moved successively underneath each gun in the direction of the row at a rate of 4 to 5 inches per minute. The glass sheets were thus coated and the coating allowed to dry.

The coated glass sheets thus produced are placed with the coated side up on the rolls of the preheat section illustrated and described above, preheated, and fed into the gas support heating section substantially as described in connection with the tempering process as described above. The temperature of the supporting gas fed to the modules was held at about 1180 degrees Fahrenheit and the top surface of the glass heated to about 1225 to 1240 degrees Fahrenheit by adjusting the radiant heat above the plates. During this heating the coating fuses and becomes tightly bonded to the glass. Thereupon it is fed to the quenching section as in the tempering operation.

By visual inspection of the above coatings and glass substrates, it is clearly apparent that no scratches or other processing marks are imparted to either the coating or glass substrate during the heat treating operation. Moreover, the glass frit, sprandel-type films applied to the glass are of excellent uniformity and are tightly adherent to the glass sheets. No thermal warping or other thermal distortion is present.

EXAMPLE II

The following film-forming solution was prepared:

| Solution No. | 1 | 2 |
|---|---|---|
| Dibutyl tin oxide (grams) | 100 | 100 |
| Ammonium acetate (grams) | 40 | 40 |
| 20% hydrofluoric acid in ethyl alcohol, 0.83 grams per cc. (grams) | 55 | 55 |
| n-Propyl alcohol (grams) | 55 | 55 |
| HCl (percent by weight based upon tin weight in the composition) | 0 | 2 |

Flat sheets of glass 12 inches square and one-quarter inch thick are heated as described above by feeding first to the preheating section and then to the gas support section until the temperature of the glass reaches the temperature set forth below. Thereupon, while the glass is supported on the module bed (thus being supported by the gas pressure zones thereof) and when the glass has reached the specified temperature, it is sprayed with 223 grams of one of the solutions at 3.3 cc. per second. The sheet is then cooled rapidly by passing through the quench section. When the surface resistivity in ohms per square of the film is in the second order Blue (100 to 200 millimicron thickness), the following are results to be expected at these temperatures:

| Temperature of glass, °F. | Solution No. 1 (ohms per square) | Solution No. 2 (ohms per square) |
|---|---|---|
| 1,180 to 1,200 | 300 | 300. |
| 1,270 to 1,280 | 90 | 90. |
| 1,320 | 60 to 65 | 60 to 65. |
| 1,400 | 75 to 80 | 55 to 60. |

EXAMPLE III

The following solutions, Nos. 14 to 19, inclusive, were applied "cold" onto 12 inch by 27 inch by one-quarter inch flat plate glass panels by roll coating as wet films having a film thickness of approximately 0.16 inch prior to heat treatment:

| Solution No. | Ingredients | Percent by weight |
|---|---|---|
| 14 | 2,2,4-trimethyl-1,3-pentane diol titanate | 11.1 |
|  | Xylene | 38.9 |
|  | Englehart Industries #6617 Resinate Solution (essential oil-aromatic solvent solution of terpene resin, the solution having 75% by weight solids and 25% by weight volatiles after heating for 3 hours at 250° F.). | 50.0 |
| 15 | Tin betaethoxy propionate (32% by weight of tin). | 7.34 |
|  | Cellosolve (2-ethoxyethanol) | 42.66 |
|  | Englehart Industries #6617 Resinate solution | 50.00 |
| 16 | Cobalt-2-ethyl hexoate (12% by weight cobalt) | 10.85 |
|  | Xylene | 39.15 |
|  | Englehart Industries #6617 Resinate Solution | 50.00 |
| 17 | Iron-2-ethyl hexoate (12.6% by weight iron) | 12.4 |
|  | Xylene | 37.6 |
|  | Englehart Industries #6617 Resinate Solution | 50.0 |
| 18 | "Goldbrite 6763" (a gold alkyl mercaptide containing 12% by weight of available gold). | 12.44 |
|  | Xylene | 37.56 |
|  | Englehart Industries #6617 Resinate Solution | 50.00 |
| 19 | Bismuth-2-ethyl hexoate | 9.14 |
|  | "Goldbrite 6763" | 12.44 |
|  | "Bismuth Resinate" (Bismuth (salt of rosin-tall oil fatty acid mixture containing up to 50% rosin). | 19.10 |
|  | Xylene | 22.12 |
|  | "QZ 6288" Silicone (Dow-Corning's methyl, phenyl substituted polysiloxane resin (100% solids); specific gravity of 1.15; 42% by weight available $SiO_2$; elemental analysis: C=52.23%, H=5.00%, Si=22.44%, O=20.33%). | 3.50 |
|  | Cellosolve | 21.88 |
|  | 2,2,4-trimethyl-1,3-pentane diol titanate (6.5% by weight titanium). | 11.82 |

The coated panels were then placed on the preheat section and fed to the gas support section, as described in connection with the tempering operation, and heated to a thermal deformation temperature while simultaneously supported on the module bed discussed above and illustrated in the drawings. The coated panels passed through a plurality of temperature sections (700 degrees Fahrenheit and 1000 degrees Fahrenheit in the preheat section and over the module bed or final section at a temperature of 1200 degrees Fahrenheit) in four and one-half minutes, and were thereafter tempered (estimated over 3000 m. per inch). There was no visual evidence of distortion in the plates or coatings, or appearance of "fume burn off" in any furnace section. The quench spacing was 0.300 inch. A top plenum pressure of 24 oz./in.² and a bottom plenum pressure of 12 oz./in.² were applied. The coated films had an approximate thickness of 80–100 m. after firing. Each coating was tightly adherent to its glass base and possessed good uniformity and hardness (scratch resistance).

*Properties after firing*

| Solution No. | Light reflective and transmittance reflective range, percent | Visible transmittance percent |
|---|---|---|
| 14 | 20 to 30 | 72. |
| 15 | 10 | 82. |
| 16 | 12 to 25 | 40 to 70. |
| 17 |  |  |
| 18 |  |  |
| 19 | 8 to 25 | 20 to 25. |

Figure 9:
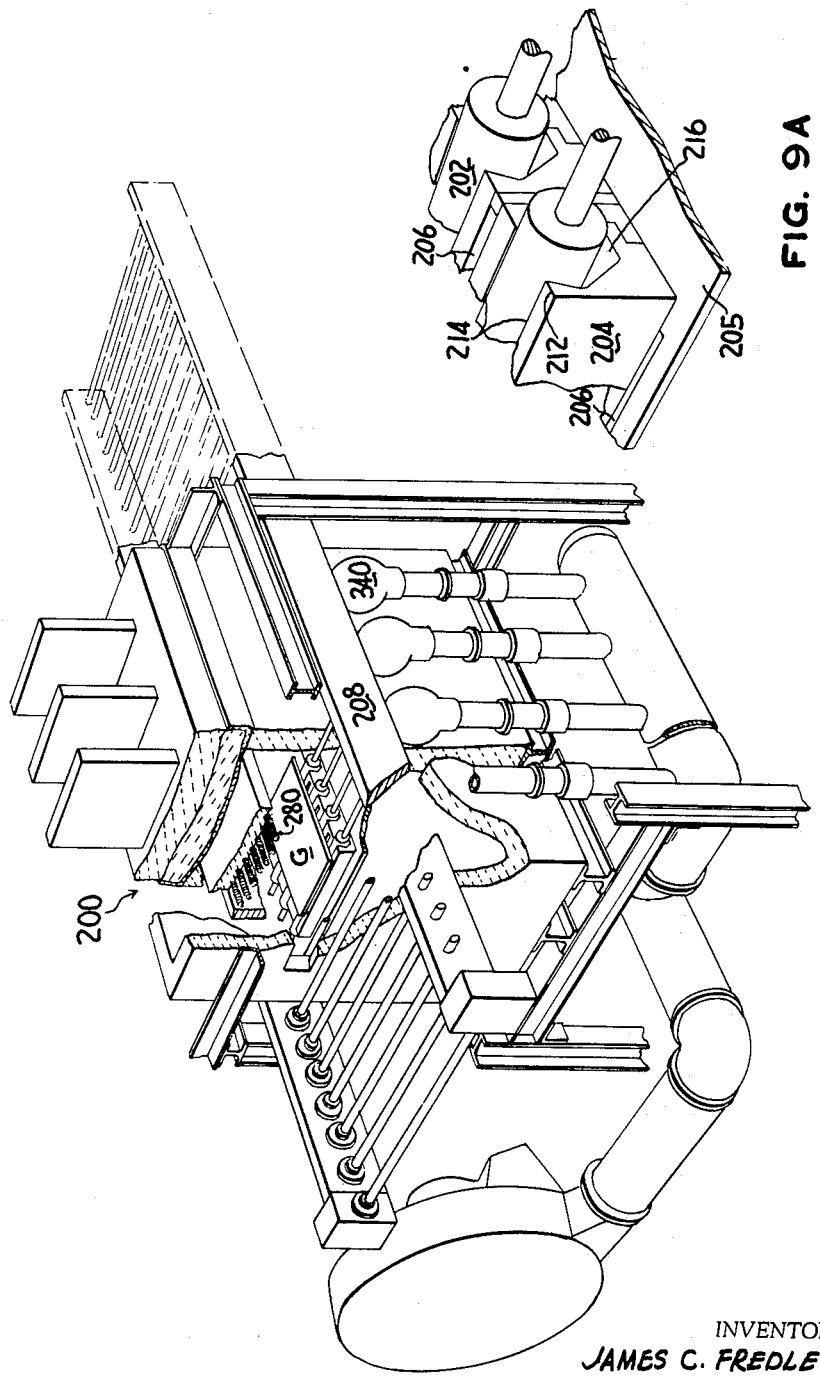
FIG. 9 is a perspective, partly schematic, partial view of a system similar to that shown in FIG. 1 but illustrating a further method and means of supporting the glass while undergoing the treatment herein contemplated.
Figure 10:
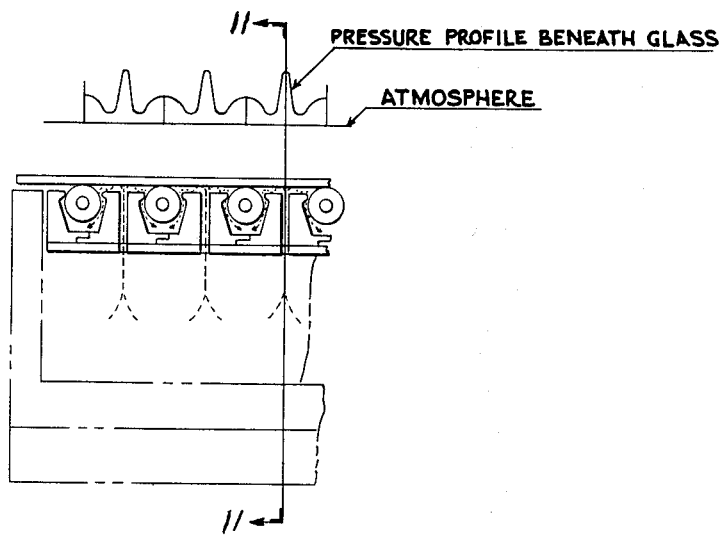
FIG. 10 is a schematic view of a section of the embodiment of FIG. 9 showing diagrammatically the flow and exhaust of the support gases and presenting a diagrammatic graph in conjunction therewith.
Figure 11:
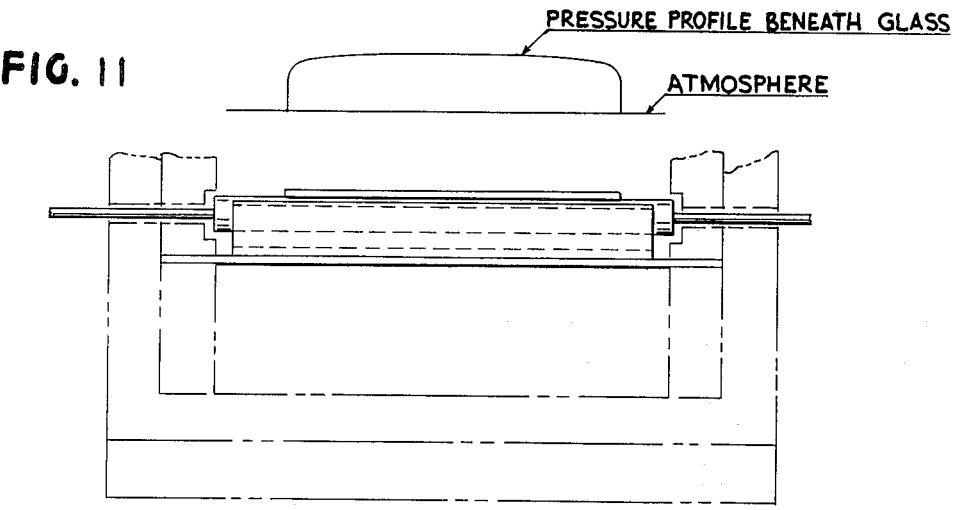
FIG. 11 is a schematic view taken along line 11—11 of FIG. 10 and presenting a diagrammatic graph in conjunction therewith.

FIGS. 9–11 schematically illustrate an embodiment of the invention (omitting the details of the preheat and quenching sections) functioning in a different and perhaps simpler manner than the rather complex devices heretofore disclosed in this application. While this embodiment does not achieve all of the advantages of the other devices disclosed herein, it is somewhat lower in cost and yet is capable of heating glass sheet with results superior to those which accrue by practice of prior art methods.

As shown in FIGS. 9 and 9A, a partial gas support heating section 200 is provided in which glass sheets (which may have a coating to be fused as herein contemplated or which are to be heated prior to coating) may be received from a conveyor or a prior processing section and be heated to deformation temperature and thence conveyed to subsequent processing sections. Rolls 202 provide a plane of support for the glass G, are spaced from each other along the path of travel, and may be rotated by conventional driving means to convey the glass through the heating section. Refractory channel-shaped members 204, supported on slotted plate 205, define a slot 206 across the width of the conveying path and provide a passageway from a plenum chamber 208 to a zone between the plane of support defined by the upper peripheries of rolls 202 and the upper flanges 212 of channels 204. Additional slots 214 adjacent each roll 202 are formed by the flanges 212. These slots lead to exhaust channels 216 and provide passages for the escape of gas within the conveying path. Passages 216 have open ends communicating with the surrounding atmosphere. Burners 340 supply heated products of combustion under pressure to plenum chamber 208 in the same manner as previously explained in connection with burners 34 and plenum chambers 33. Gas flows from the plenum chamber 208 through slots 206, across flanges 212 of channels 204, through slots 214 into exhaust channels 216, and thence to atmosphere. Slots 214 and the gap between flanges 212 and the glass G restrict the flow of gas to provide sufficient pressure build-up beneath glass sheet G to create a supporting force between the rolls. Because exhaust passages extend across the width of the supported glass, the direction of gas flow is essentially transverse to the axis of rotation of the rolls. This provides a substantially uniform support pressure across the conveying path and provides uniform heat transfer across the width of the glass sheet. In this manner the glass is partially supported by gas and partially supported by the rolls, the gas pressure being adjusted to maintain the glass in frictional contact with the rolls. The glass is heated convectively by the gas and radiantly from above by radiant heaters 280.

The glass thus heated may be coated while supported partially in the rolls and partially by the gas pressure zones established between the rolls.

FIGS. 10 and 11 schematically illustrate the pressure profile of the embodiment of FIG. 9. Because of the proximity of the slots 206 to the supported glass surfaces, and because there is a flow of gas from each slot toward the adjacent rolls, a higher pressure is noticed directly above each slot. This is caused by the velocity pressure of the gas flowing through the slots and impinging upon the glass sheet, and by the necessarily lower pressure which must be maintained at slots 214. Because the glass sheet is partially supported by the rolls, there is no fluid pressure exerted on the glass at the points of contact. Movement of the glass across the pressure variations between each pair of adjacent rolls averages the effect of the variations and hence diminishes their effect upon the glass.

FIG. 11 shows that the pressure profile across the width of the conveying path is substantially uniform. Uniformity is primarily due to the existence of exhaust slots 214 which allow a substantially uniform flow of gas at all points across the width of the conveying path and diminishes the flow laterally of the path.

Although the present invention has been described with reference to the specific details of certain embodiments thereof, it is not intended that such details shall be regarded as limitations upon the scope of the invention except insofar as included in the accompanying claims.

We claim:
1. A method of producing coated glass sheet which comprises subjecting the glass and a coating on a surface thereof to a temperature at which the glass is deformable and at which said coating is heated and converted into its finished form, and at least partially supporting a major surface of the glass sheet throughout the major part of the area thereof upon hot gas at a glass deformation temperature during such heating thereby minimizing undesirable deformation of the glass during such heating.

2. The process of claim 1 wherein the glass sheet is at least partially supported upon the hot gas while the sheet is below deformation temperature and is then heated to deformation temperature while so supported.

3. A method of producing an enameled glass sheet which comprises applying an enamel frit to the glass, subjecting the glass and the frit to a temperature at which the glass is deformable and at which the frit fuses and becomes bonded to the glass, and at least partially supporting the glass sheet throughout the major portion of the area thereof on gas while the glass is subjected to said temperature, thereby minimizing impairment during the fusion of said frit, said gas being at a temperature high enough to keep the glass at a deformation temperature.

4. A method of producing an enameled glass sheet which comprises applying an enamel frit to the glass, subjecting the glass thus coated with frit to a temperature at which the glass is deformable and the frit fuses and becomes bonded to the glass sheet, and supporting and conveying the glass sheet on gas while the glass coated with frit is subjected to said temperature, thereby minimizing impairment during the fusion of said frit, said gas being at a temperarutre high enough to keep the glass at a deformation temperature.

5. A method of coating glass which comprises heating gas to a temperature above the deformation temperature of the glass to be coated, directing a flow of said gas against the undersurface of the glass at a deformation temperature to at least partially support the glass upon the heated gas, applying a coating to the upper surface of the glass and converting the coating into its finished form while the glass is deformable and at least partially supported upon the heated gas.

6. A method of coating a glass sheet which comprises at least partially supporting a glass sheet on upwardly flowing streams of gas, maintaining said gas at a temperature above the deformation temperature of said glass, and directing a spray of a film-forming material to the uppermost surface of said glass sheet and said region adjacent thereto while said glass sheet is at deformation temperature.

7. A method of producing enameled glass which comprises applying an enamel frit to the glass and heating the glass thus coated with frit to a deformation temperature at which the frit fuses and becomes bonded to the glass while at least partially supporting the glass on gas and maintaining the temperature of the gas high enough to keep the glass at said temperature.

8. A method of coating glass which comprises supporting glass at a deformation temperature on gas while applying a coating to the glass and maintaining the temperature of the gas high enough to keep the glass at said temperature.

9. A method of coating glass which comprises heating gas to a temperature above the deformation temperature of the glass to be coated, and supporting the glass at a deformation temperature upon the heated gas while applying the coating to the glass.

10. A method of producing coated glass which comprises subjecting the glass and the coating thereon to heat at a deformation temperature of the glass while at least partially supporting the glass on a gas and maintaining the temperature of the gas high enough to keep the glass at said temperature.

References Cited by the Examiner

UNITED STATES PATENTS

| | | | |
|---|---|---|---|
| 1,622,817 | 3/1927 | Waldron | 214—1 |
| 2,194,611 | 3/1940 | Paddock et al. | 117—125 |
| 2,522,531 | 9/1950 | Mochel | 117—229 XR |
| 2,678,237 | 5/1954 | Allender et al. | 214—1 |

RICHARD D. NEVIUS, *Primary Examiner.*

JOSEPH B. SPENCER, *Examiner.*

R. B. MURRAY, *Assistant Examiner.*